Nov. 6, 1956 T. J. CRAWFORD 2,769,887
HIGH SPEED INDUCTION WELDING
Filed May 17, 1954

INVENTOR.
BY THOMAS J. CRAWFORD
Oberlin + Limbach
ATTORNEYS

United States Patent Office 2,769,887
Patented Nov. 6, 1956

2,769,887

HIGH SPEED INDUCTION WELDING

Thomas J. Crawford, Berkley, Mich.

Application May 17, 1954, Serial No. 430,086

5 Claims. (Cl. 219—8.5)

This application is a continuation-in-part of my co-pending application, Serial No. 205,511, filed January 11, 1951, now Patent No. 2,687,464, dated August 24, 1954, and relates, as does the latter, to high-frequency induction welding for the continuous production of welded tubing. More particularly, the present disclosure is concerned with minimization of modulation of the high-frequency current induced in the work substantially to eliminate periodic fluctuation of the welding heat when welding at high speeds.

In accordance with my said co-pending application, welded tubing is formed in continuous operation by causing high-frequency induced current to flow in the seam edges of a tubular metal blank having an open longitudinal seam the width of which decreases progressively until the seam edges meet. The induced current flow is circumferential of the blank in the area of the inducing field, along the approaching seam edges in instaneous respectively opposite directions, and around the point of edge juncture. As more fully described in my noted prior disclosure, and in the following detailed description, this current flow in the work produces a concentration of current at the immediate area of the point of seam edge juncture without greatly heating the body of the tube, and it is only just before such point that the seam edges are heated to the welding temperature.

The increase in current density at the point of edge juncture is very abrupt and since it is effective only over a very small longitudinal length of the blank, the heat level produced thereby in the seam edges as the same move continuously through this welding zone must be substantially constant to obtain satisfactory welding at high speeds. If the heat level fluctuates, successive portions of the seam edges passing rapidly through the small welding zone are heated to correspondingly varying degrees, and, at a particular speed, the amount of heat produced in some seam edge portions is insufficient to raise the same to welding temperature. When this occurs, gaps form in the welded seam or, in other words, stitching of the seam edges results, the gaps becoming more frequent as the speed of the blank is further increased. Consequently, the high-frequency oscillations of the induced current require not only to be continuous but of nearly constant amplitude, variations in current amplitude causing the heat level correspondingly to vary. It is, furthermore, insufficient merely to raise the average heat level, without measures to eliminate any fluctuation which may obtain, since this would also raise the peak heat values and present the risk of burning holes in the seam edges and thereby producing an equally unsatisfactory weld.

It is extremely important to provide substantially constant heat in the effective welding zone in the welding of non-ferrous metals, such as aluminum, magnesium, brass, and copper alloy, since such metals are characterized by narrow plastic ranges and high heat conductivity. Because of the latter factor, the welding should be carried out at high speed to avoid heating too wide an area, and the narrow temperature range within which proper welding takes place makes the operation particularly sensitive to heat fluctuation. Fluctuations which might be tolerable in welding ferrous metals, could result in stitching or serious shape-distorting flow, or both, if present in welding non-ferrous metals.

In the preferred apparatus for inductation welding in the manner set forth, the radio-frequency generator used to supply the high-frequency oscillations to the inductor comprises a vacuum tube oscillator and a transformer rectifier operative to step-up and rectify the alternating current voltage available from a conventional source of supply. The rectifier provides the necessary plate voltage for the oscillator tube, and this supply should theoretically be wholly direct current voltage, since any alternating voltage component, or ripple, produces amplitude variation in the oscillator output current and hence in the current induced in the work. Thus, if the tube plate is connected to a source of alternating current only, the oscillator output current is both discontinuous and of varying amplitude; if the plate supply includes a direct current voltage component and a superimposed relatively large ripple component, the oscillator output current is continuous but still variable; and if a pure direct current source is used, the tube output oscillations are both continuous and of constant amplitude. For the values of plate supply needed in radio-frequency tube generators, a three-phase full-wave rectifier is preferably employed, and the output of such a rectifier inherently includes an alternating component or ripple, thus normally causing weld stitching at the high rates of production of the welded tubing contemplated herein.

It is among the principal objects of my invention to provide for the continuous production of welded tubing at high speeds without stitching of the welded seam, and to accomplish this with apparatus including a radio-frequency generator of the type set forth, improved, however, to eliminate substantially the inherent amplitude variation in the output oscillations of such a generator. Another object is to make possible quality welding of non-ferrous metals by high-frequency current and at high speeds which would, but for the present improvements, result in weld stitching or otherwise unsatisfactory welds. It is also an object to provide in combination in such high-frequency induction apparatus a filter operative to minimize amplitude variation in the current oscillations supplied to the inductor, thereby to produce a substantially constant heat level in the work. Other objects and advantages will become apparent as the following description proceeds.

To the accomplishment of the foregoing and related ends, the invention, then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Figure 1:
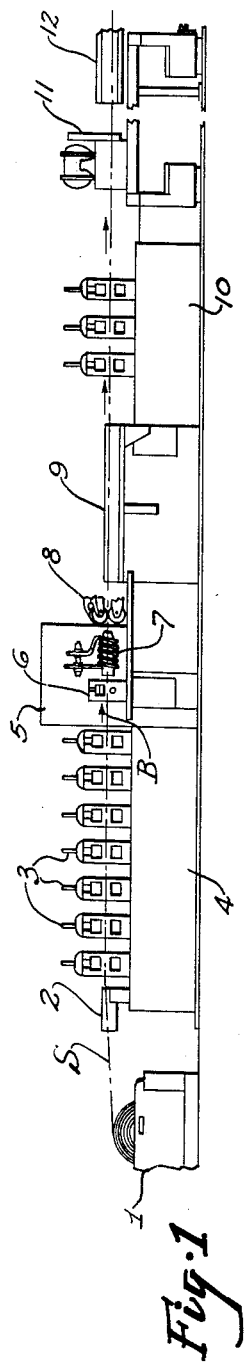
Fig. 1 is a diagrammatic elevational view of a tube mill adapted to be utilized in accordance with my invention, most of the units comprising the same being of standard type and commercially available.

Referring now more particularly to Fig. 1 of the drawing, the flat metal strip S is withdrawn from the coil box or uncoiler 1 and passes through an edge scarfing device 2 to the power driven roll stand 3 of the forming mill 4, such rolls being operative to advance such strip while progressively forming the same to desired tubular cross-section. The tube blank B thus formed now advances to the welder 5 which comprises a seam guide unit 6, a high frequency induction coil 7, and a squeeze roll unit 8. The welded tube next passes through the water cooling section 9, sizing and straightening unit 10 and thence to flying cut-off 11 and run-out table 12 where the lengths of finished tubing are collected and bundled. An external bead or flash trimmer (not shown) may also be located intermediate the squeeze roll unit and the cooling section. All of the units above referred to and which together comprise the complete mill are of well-known construction and commercially available with the exception of the welder 5 comprising such seam guide 6, induction means 7, and the squeeze rolls 8.

A description of the construction of the seam guide and squeeze rolls is, however, not essential to an understanding of the present invention and, therefore, will not be here set forth. Reference may be had to my aforesaid co-pending application for these and other details of the apparatus not specifically discussed herein. In operation, however the effect of the guide is to position and space apart the opposed seam edges of the tube blank B immediately prior to passage of such blank through the induction coil, thereby properly to position such seam for conjoint action of the squeeze rolls and also, in cooperation with such rolls, to determine the angle of approach of the opposed seam edges to the point of welding.

The point of bringing together the opposed seam edges relative to the inductor is critical and must be spaced axially from the confines of the effective current-inducting field of such inductor so that the current induced in the tube blank will be caused to flow lengthwise of such blank along the seam edges to their point of juncture. The "skin effect" and "proximity effect" of such induced current consequently achieve my object of concentrating the welding current (and the heat developed thereby) at the opposed faces of the seam edges as they join without greatly heating the body of the tube. Thus, if the seam edges were brought into contact before passage through the inductor there would be slight resistance heating at such edges but no great concentration of current density at a single point. If the seam edges were brought together within the confines of the coil, the heating effect would be somewhat enhanced but there would be a very large power loss and the process would not be commercially feasible. By bringing the opposed seam edges together sufficiently beyond the inductor, the induced current is caused to concentrate at such edges and particularly at the point of contact of the latter. The most efficient use is accordingly made of the power applied without unduly heating the body of the tube either circumferentially or longitudinally beyond the exact point of welding. Since high-frequency currents do not penetrate much below the surface of the metal conductor and tend to follow the path of least impedance, it will readily be seen that the current induced in the tube blank will pass circumferentially of the inner and outer surfaces of the latter and then along the opposed surfaces of the seam edges to the point of welding contact W of such edges. This "skin effect" is much enhanced in the region of the seam edges by the "proximity effect" resulting from the opposite directions of flow of the induced current along the opposed seam edges. At the point of seam edge juncture, these two effects result in an extremely high current density being achieved.

Figure 2:
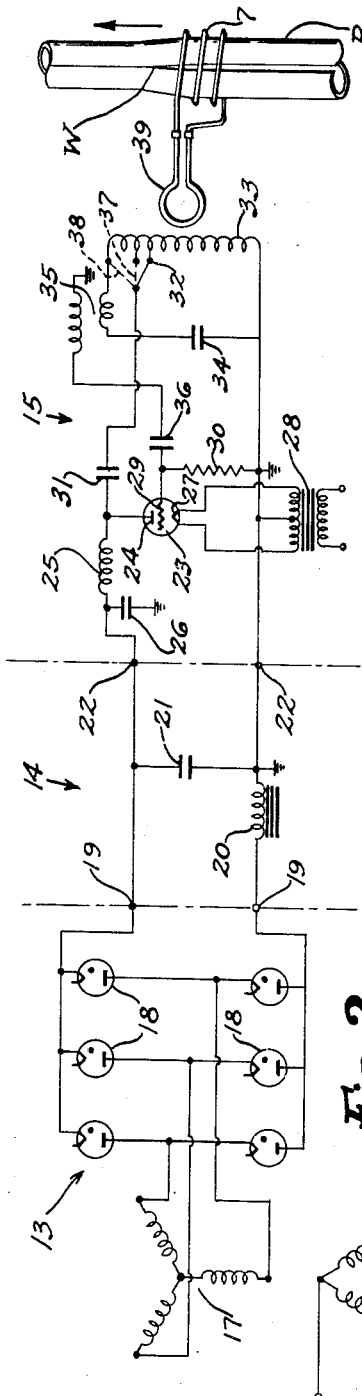
Fig. 2 is a schematic diagram of the generator used to supply high frequency energy to the induction heater.

Referring now to Fig. 2, the radio-frequency generator for supplying energy to the inductor 7 is shown as comprising three sections 13, 14 and 15 respectively constituting rectifier, filter and oscillator stages. Rectifier section 13 is of well-known design and includes a three-phase transformer having a primary 16 adapted to be connected to a suitable three-phase source of alternating current and a secondary 17, the two effecting the desired step-up of the source voltage. Six rectifier tubes 18 are connected in the circuits of the secondary windings so as to provide three-phase full-wave rectification in conventional manner. Since the interrelated conductive action of the several rectifier tubes resulting in the desired output is well-understood to those skilled in the art, it will not be described in detail. The rectifier output appearing at the terminals 19 always has the same polarity, but its magnitude fluctuates about an average value, the fluctuation above and below such value being called the ripple. This alternating or ripple voltage must be reduced to an extremely low amplitude for the considerations discussed earlier and preferably the amplitude should not be greater than 1% of the effective direct current output voltage. This is considerably less than the ripple normally inherent in such a rectifier, which has, in those commercially available rectifiers used, been found to be on the order of 9% of the direct current output voltage.

In order thus to reduce the ripple, the filter stage 14 is provided and connected to the output terminals 19 of the rectifier. The filter network illustrated in Fig. 2 comprises a reactor 20 in series in one side of the rectifier output and a capacitor 21 connected across the output, the reactor being placed before the capacitor to form therewith a reactor-input type of filter. This type of filter is preferred, as contrasted to a capacitor-input filter, since in the latter arrangement the capacitor would pass a larger peak current and thus require the peak anode current ratings of the rectifier tubes to be greater.

The oscillator section 15 is connected to the filter output terminals 22 so that the oscillator tube 23 is connected thereacross with the tube plate 24 being supplied the necessary positive potential. A radio-frequency choke coil 25 and a bypass condenser 26 are provided in the input to the oscillator to keep the high-frequency oscillations out of the direct current supply. Cathode 27 of the oscillator tube is conventionally heated through a usual filament transformer 28, the primary of which is connected to a suitable alternating current supply. The oscillator has, of course, a grid 29 and, in the circuit illustrated, a grid resistor 30 included in the grid-cathode circuit. The plate 24 is connected through a blocking capacitor 31 to a tap 32 on and intermediate the ends of an inductance 33 which, together with a capacitor 34, forms a tank circuit for the tube. Feed-back to the grid is provided by means of a small transformer 35 coupling the tank and grid circuits through a blocking capacitor 36. This particular tank circuit is disclosed and claimed in my co-pending application, Serial No. 424,377, filed April 20, 1954, and as there described, the use of the tap connection permits a relatively low voltage and inexpensive oscillator to supply the amount of high-frequency energy required by the load. The dotted lines 37 and 38 show alternate connections of the plate with different point on the inductance for the purpose of controlling the oscillator output to meet particular operating conditions as described in said application Serial No. 424,377. Inductor 7 is coupled to the tank inductance 33 by means of a single turn coil 39, which together with the inductance forms an impedance matching transformer.

Reactor 20 and capacitance 21 serve to reduce the ripple inherent in the rectifier output by the combined energy absorption action of the capacitor and the resistance of the reactor to changes in the magnitude of the current flowing therethrough. The result of the two effects is to deliver nearly constant voltage to the oscillator, and the output oscillations of the latter are thereby substantially constant in amplitude. As stated previously, the heat level produced by the high-frequency current induced in the work is accordingly likewise substantially constant and it is, therefore, possible to weld at high speed without either stitching or burning of the seam edges. As illustrative of the improved results, 14 S-O aluminum alloy tubing was welded in the manner set forth, without the filter, however, so that the plate supply voltage furnished by the rectifier included the normal 9% ripple. Stitching of the seam edges was quite evident at a speed of 77 feet per minute. With the filter network of Fig. 2 added, in which reactor 20 had an inductance of 0.2 henry and capicitor 21 a capacitance of 1.0 microfarad, the blank was welded at such speed without stitching or other defect. In the latter case, the filter reduced the ripple from its normal amplitude to about 1% of the effective direct current rectifier output voltage.

Figure 3:
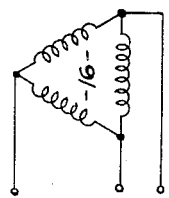
Figs. 3 and 4 show diagrammatically different filter networks which may be used respectively in place of the filter illustrated in the complete circuit of Fig. 2.
Figure 4:
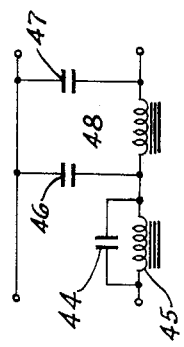

The higher the speed, the more critical the need for constant amplitude current and the circuits of Figs. 3 and 4 are provided as optional filter networks for use in place of that illustrated in the complete circuit of Fig. 2 to reduce even further the ripple component of the rectifier output. The network of Fig. 3 is a two-section reactor-input filter, the first section comprising reactor 40 and capacitor 41 and the second comprising reactor 42 and capacitor 43. With proper selection of the inductance and capacitance of the several elements, it is possible to reduce the ripple to about 0.5% of the effective direct current output voltage. This result has been obtained by using reactors 40 and 42 of 0.1 henry each and 1.0 microfarad capacitors for each element 41 and 43.

The filter network of Fig. 4 provides a still greater reduction of ripple by virtue of the trap comprising capacitor 44 and reactor 45 connected in parallel to form a resonant circuit in one side of the rectifier output. This circuit is tuned to resonate at the ripple frequency and thus offer extremely high impedance to the ripple current. Following the trap is a pi network including parallel capacitors 46 and 47 and an intermediate series reactor 48. A filter of this further form has been used wherein capacitors 46 and 47 each had a capacitance of 1.0 microfarad and the reactor 48 had an inductance of 0.2 henry, the trap being tuned to resonate at the ripple frequency. The rectifier output ripple, again normally about 9%, in this case was reduced to approximately 0.1% of the direct current output.

The smoothing out of the ripple by the filters described, in all cases, provides more efficient use of the energy supplied and permits a higher average value to be used safely, the considerable reduction of the normal peak values substantially eliminating the danger of burning the seam edges. As discussed in the foregoing, the ripple may be reduced in varying degrees by proper design of the filter network, and the principles of the invention therefore can readily be adapted to varying conditions of welding presenting different requirements insofar as the amount of ripple tolerable without adverse effect on the weld quality is concerned. Certain variable factors in metals, such as plastic range and heat conductivity, have previously been mentioned as influencing the speed of the welding operation, and the speeds at which stitching would occur without the substantially constant heat level I provide in the welding zone is variable with such factors. In commercial practice, however, stitching is apt to occur at a speed of about 40 feet per minute and, of course, at higher speeds.

In addition to those metals specifically noted earlier, carbon steel, stainless steel, nickel, silicon bronze, Phosphor bronze, phosphorous deoxidized copper, and zinc have been welded successfully in the manner set forth above. This listing is not to be considered exhaustive but should demonstrate the extreme versatility of the welding procedure. Also indicative of the improved results is the fact that extremely thin walled tubing which may, for example, have a wall thickness of approximately .102 inch can be welded, such thickness being considerably less than the smallest like dimension of tubing successfully welded heretofore. Such tubing is disclosed in detail in my co-pending application Serial No. 320,201, filed November 13, 1952.

As illustrated in the drawing, all filter reactors are of the iron-core type. In accordance with recognized electrical engineering principles, the effective limit of the inductor field may be defined as being reached at the cross-sectional plane normal to the tube blank axis beyond the inductor where the average density within the area of the tube blank of the longitudinal components of flux has declined to a value $1/e$ times the value of the average flux density within the area of the tube blank at the center of the inductor coil (where $e$ is the base of the Napierian logarithmic system). When welding the smaller diameters of tubing such as five-eighth inch to one and one-half inch diameter tubing, the point of welding will ordinarily be a distance beyond the region of high flux density equal to from about one to about two diameters of the tube being produced. However, when relatively large diameter tubing is welded, such as tubing from four to eight inches in diameter, the point of welding will ordinarily be somewhat closer to the region of high flux density in terms of tube diameters since the inductor will be more tightly coupled to the tube acting as the secondary, there being no need to increase such mechanical spacing in proportion to the tube size. The point of welding can, in fact, sometimes be removed as much as five tube diameters from the end of the inductor coil, for example, although this will of course be relatively inefficient due to greater power input requirements. Similarly, the point of welding should not too closely approach the effective limit of the inductor field, since the induced current will not then be sufficiently concentrated in the seam edges to be efficiently utilized, and in materials having a narrow melting temperature range the highly heated region will be relatively wide with resultant collapse or at best an extremely wide cast weld structure. Accordingly, such point of welding should ordinarily be at least one-third of the tube outer diameter beyond the end of the inductor coil and, therefore, spaced substantially beyond the effective limit of the inductor field.

Both the frequency and power output of the generator are likewise variable depending upon the particular welding operation to be performed, with regard to the composition and characteristics of the metal, speed of welding, and the like. An oscillator having a rated output of 20 kilowatts at 400 kilocycles per second has been found suitable, but oscillators having outputs of as much as 50 or 100, or even more, kilowatts may in some cases be employed. The frequency employed in practice may ordinarily range from about 9,600 to 450,000 cycles, and may exceed 500,000 cycles for very small diameter tubes, 10,000,000 or more theoretically being feasible. In the case of very large diameter tubes, the frequency may actually be as low as 2,800 cycles, although this will probably be a rare occurrence.

Welding in accordance with the principles discussed readily produces a cast weld seam of very small width, generally not greater than 20% of the wall thickness of the body of the welded tube. In fact, in many cases a cast weld is produced which is no wider than 3% of the wall thickness, due in part to extrusion of the molten metal by pressure of the squeeze rolls. It will be recalled that the opposed surfaces of the seam edges will ordinarily be brought to molten condition at the point of welding, but that the body of the tube is relatively unaffected even in close proximity to such seam edges. This confinement of the heated areas of the respective seam edges at the high rates of production noted, results in a finished article having metallurgical characteristics which are ordinarily substantially unchanged from those of the original blank from which the tube is formed. By performing a subsequent sizing operation slightly to reduce the diameter of the finished article, the cast weld metal of the seam will be preferentially worked and the characteristics of the entire tube rendered still more uniform.

For additional preferred operations and apparatus likewise relating to induction welding of the nature discussed herein, reference may be had to my further co-pending applications, Serial No. 385,735, filed October 13, 1952, and Serial No. 340,837, filed March 16, 1953, now Patent No. 2,687,465, dated August 24, 1954.

Other modes of applying the principle of the invention may be employed, change being made as regards the details described, provided the features stated in any of the following claims, or the equivalent of such, be employed.

I therefore particularly point out and distinctly claim as my invention:

1. In apparatus for high speed continuous production of welded tubing from metal strip, including a mill for forming such strip into a tubular blank having an open longitudinal seam, in combination, an induction heating coil through which such tubular blank is adapted to pass, a high-frequency generator operative to supply energy to said heating coil so that the coil induces high-frequency current flow in the tubular blank as the latter is passed therethrough, said generator comprising a tube oscillator having a tuned plate circuit the inductance of which is coupled to said heating coil, a rectifier adapted to be connected to a conventional source of alternating current and to provide an output voltage for the plate supply of the oscillator tube, such rectifier output voltage normally including an alternating voltage component in addition to the desired direct current voltage, a filter connected between said rectifier and oscillator operative substantially to remove such alternating component of the rectifier output voltage and deliver to the oscillator plate a voltage of substantially constant magnitude, thereby substantially to eliminate the amplitude variation of the high-frequency output oscillations of the oscillator and the consequent fluctuation of the heat level produced in the tubular blank by the induced current flow therein which would result if the rectifier output alternating component is not thus substantially removed, and pressure means spaced from and following said heating coil operative to force the opposed edges of such seam together at a point beyond but adjacent the effective field of the coil, the induced current flow thereby being concentrated in the opposed seam edges and at their point of juncture, the concentration of current and the substantially constant heat level produced thereby in the blank permitting welding of the seam edges at high speed without stitching thereof.

2. In a method of producing welded tubing from non-ferrous metal strip having a narrow plastic range and high heat conductivity, which includes continuously forming from such strip a tubular blank having an open longitudinal seam, bringing the seam edges progressively together, and causing high-frequency current to flow along such edges a predetermined distance to their point of juncture and there to concentrate at the extreme opposed surfaces of such edges; the steps of deriving such current from a direct current energized high-frequency generator the high-frequency output oscillations of which are normally of varying amplitude due to an alternating component in the energization current thereof, advancing such blank at a rate so high that such normal variation in the high-frequency oscillations results in stitching of the seam edges, and filtering the generator energization source to reduce such alternating component of the same and thereby eliminate such stitching.

3. In a method of producing welded tubing from non-ferrous metal strip having a narrow plastic range and high heat conductivity, which includes continuously forming from such strip a tubular blank having an open longitudinal seam, bringing the seam edges progressively together, and causing high-frequency current to flow along such edges a predetermined distance to their point of juncture and there to concentrate at the extreme opposed surfaces of such edges; the steps of developing a magnetic field with a direct current energized high-frequency generator the high-frequency output oscillations of which are of normally varying amplitude due to an alternating component in the energization current thereof, advancing such blank through the thus developed field with the point of seam edge juncture lying beyond the effective limit thereof and at a rate so high that such normal variation in the high-frequency oscillations results in stitching of the seam edges, and filtering the generator energization source to reduce such alternating component of the same and thereby eliminate such stitching.

4. In a method of producing welded tubing from a non-ferrous metal strip having a narrow plastic range and high heat conductivity, wherein the strip edges are progressively brought together to form a tubular blank having a longitudinally extending seam and high-frequency current is caused to flow along such edges to the point of juncture thereof, the current being highly concentrated at such point at the opposed seam edge surfaces and such surfaces being pressed together to obtain welding of the seam; the steps of producing such a welding current in the blank seam edges having not more than 1.0% variation in the amplitude of the high-frequency alternations thereof, and bringing such seam edges together at a rate to confine the heat produced by such current to the immediate region of the current path so that under such welding pressure the width of resultant seam weld is not greater than 20% of the wall thickness of the body of the tube.

5. In a method of producing welded tubing from a non-ferrous metal strip having a narrow plastic range and high heat conductivity, wherein the strip edges are progressively brought together to form a tubular blank having a longitudinally extending seam and high-frequency current is caused to flow along such edges to the point of juncture thereof, the current being highly concentrated at such point at the opposed seam edge surfaces and welding of the seam obtained; the steps of rectifying and filtering alternating current to produce direct current of substantially constant magnitude, applying such direct current to the plate of a tube oscillator having a tuned output circuit, stepping up the voltage across such tuned circuit by auto-transformer effect in the inductance thereof, coupling the output and input circuits of the tube so that the same oscillates, and applying the high-frequency output oscillations thereof to produce the highly concentrated welding current in the tube blank having a substantially constant magnitude.

References Cited in the file of this patent

UNITED STATES PATENTS

| | | |
|---|---|---|
| 1,365,198 | Sessions | Jan. 11, 1921 |
| 2,416,172 | Gregory et al. | Feb. 18, 1947 |